(12) United States Patent
Kim

(10) Patent No.: US 9,200,814 B2
(45) Date of Patent: Dec. 1, 2015

(54) VENTILATING APPARATUS

(75) Inventor: Young Hoon Kim, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 955 days.

(21) Appl. No.: 13/322,734

(22) PCT Filed: May 26, 2010

(86) PCT No.: PCT/KR2010/003320
§ 371 (c)(1),
(2), (4) Date: Nov. 28, 2011

(87) PCT Pub. No.: WO2010/137864
PCT Pub. Date: Dec. 2, 2010

(65) Prior Publication Data
US 2012/0071080 A1   Mar. 22, 2012

(30) Foreign Application Priority Data
May 29, 2009   (KR) .................. 10-2009-0047374

(51) Int. Cl.
| F24F 7/08 | (2006.01) |
| F24F 13/24 | (2006.01) |
| F24F 12/00 | (2006.01) |
| F24F 13/20 | (2006.01) |
| F24F 1/00 | (2011.01) |
| F24F 6/00 | (2006.01) |

(52) U.S. Cl.
CPC .............. *F24F 12/006* (2013.01); *F24F 13/20* (2013.01); *F24F 1/0007* (2013.01); *F24F 1/0025* (2013.01); *F24F 6/00* (2013.01); *F24F 2013/242* (2013.01); *Y02B 30/563* (2013.01)

(58) Field of Classification Search
CPC ...... F24F 1/0025; Y02B 13/16; Y02B 30/563
USPC ............................................ 454/252; 310/91
See application file for complete search history.

(56) References Cited

U.S. PATENT DOCUMENTS

| 3,401,870 | A | * | 9/1968 | Crowe | F04D 29/626 417/353 |
| 3,830,595 | A | * | 8/1974 | Carpenter | F16F 15/08 248/603 |
| 4,102,597 | A | * | 7/1978 | Itayama | F04D 25/166 415/101 |
| 4,253,634 | A | * | 3/1981 | Daniels | F16M 1/04 248/604 |
| 4,636,673 | A | * | 1/1987 | McDonald | H02K 5/00 310/91 |
| 4,711,293 | A | * | 12/1987 | Niwa | F24F 12/001 165/10 |
| 4,759,526 | A | * | 7/1988 | Crawford | H02K 5/00 248/604 |
| 5,038,577 | A | * | 8/1991 | Stanford | F24F 1/022 454/236 |
| 5,488,259 | A | * | 1/1996 | Cho | F16M 5/00 310/425 |
| 7,563,160 | B2 | * | 7/2009 | Kim | F24F 12/006 165/54 |
| 7,837,127 | B2 | * | 11/2010 | Kristinsson | F24F 11/0012 165/164 |

(Continued)

FOREIGN PATENT DOCUMENTS

| DE | 20305801 | 7/2003 |
| JP | 58-101297 | 6/1983 |
| JP | 05-322254 | 12/1993 |

(Continued)

*Primary Examiner* — Steven B McAllister
*Assistant Examiner* — Francis F Hamilton
(74) *Attorney, Agent, or Firm* — Dentons US LLP

(57) ABSTRACT

The present invention relates to a ventilating apparatus which minimizes the flow resistance of air flowing into a blower fan, and which reduces the noise generated by the air being discharged from the ventilating apparatus, thereby minimizing the noise generated inside the ventilating apparatus.

10 Claims, 5 Drawing Sheets

(56) References Cited

U.S. PATENT DOCUMENTS

| | | | |
|---|---|---|---|
| 2006/0052048 A1* | 3/2006 | Poirier | F24F 12/006 454/252 |
| 2007/0049189 A1* | 3/2007 | Lee | F24F 13/24 454/223 |
| 2008/0113612 A1* | 5/2008 | Chich | F24F 7/025 454/341 |
| 2009/0124188 A1* | 5/2009 | Levy | F24F 13/06 454/185 |
| 2009/0253365 A1* | 10/2009 | Gagnon | F04D 25/166 454/252 |
| 2012/0071081 A1* | 3/2012 | Park | A61L 9/16 454/252 |

FOREIGN PATENT DOCUMENTS

| | | |
|---|---|---|
| KR | 10-2005-0001506 | 1/2005 |
| KR | 10-2007-0019194 | 2/2007 |
| WO | WO 2008/105586 | 9/2008 |

\* cited by examiner

VENTILATING APPARATUS

This application is a National Stage Entry of International Application No. PCT/KR2010/003320, filed May 26, 2010, and claims the benefit of Korean Application No. 10-2009-0047374, filed on May 29, 2009, each of which is hereby incorporated by reference for all purposes as if fully set forth herein.

TECHNICAL FIELD

The present invention relates to a ventilating apparatus which can minimize noise from a blower fan.

BACKGROUND ART

In general, the ventilating apparatus is a device for discharging polluted room air and drawing-in outdoor fresh and clean air to a room. An air conditioner without a ventilating function cools or heats the room by cooling down or heating up the room air while circulating the room air. Though there are cases when a filter or the like is provided to the air conditioner, since a pollution level of the room increases slowly, and an air cleaning function of the filter or the like has a limitation, a room air ventilating process is required.

Therefore, even in a case the air conditioner is installed for circulating and cooling down or heating up the room air, there are many cases in which the ventilating apparatus is installed, additionally.

Moreover, in order to minimize heat loss in a process of exchanging the cooled/heated room air with outdoor air, a heat exchanger is provided to the ventilating apparatus for heat exchange between the air being drawn from outdoors and the air being discharged to outdoors to minimize the heat loss which is liable to take place in the ventilating process.

The ventilating apparatus may be provided. The ventilating apparatus is provided with the blower fan for forced draw-in and discharge of the air for ventilating the room. In order to make a size of the ventilating apparatus compact, as the blower fan, a cross flow fan may be provided. Since the cross flow fan is also required to have a motor assembly provided to one side thereof, there may be a difference of flow rates of the air being introduced into the cross flow fan in a direction parallel to a rotation shaft direction of the cross flow fan with a mounting position of the motor assembly and the like.

Moreover, since the cross flow fan has an air draw-in direction and an air discharge direction different from each other, a mounting direction may be determined in advance for making the air draw-in smooth into the ventilating apparatus. In this case, if a direction of a room air discharge hole of the ventilating apparatus and an air discharge direction of the cross flow fan are not the same, an additional guide duct or the like is required. However, in a case a direction of moving air is changed artificially, the noise increases and a flow loss is liable to take place.

DISCLOSURE OF INVENTION

Technical Problem

To solve the problems, an object of the present invention is to provide a ventilating apparatus which can minimize a flow resistance of air being introduced to a blower fan, and reduce noise from the air being discharged for minimizing the noise from an inside of the ventilating apparatus.

Additional advantages, objects, and features of the disclosure will be set forth in part in the description which follows and in part will become apparent to those having ordinary skill in the art upon examination of the following or may be learned from practice of the invention.

Technical Solution

To achieve these objects and other advantages and in accordance with the purpose of the invention, as embodied and broadly described herein, a ventilating apparatus includes a housing which forms an air supply flow passage for introducing outdoor air into a room, and an air discharge flow passage for discharging room air to outdoors, a blower fan provided to each of the air supply flow passage and the air discharge flow passage for discharging the room air and drawing-in outdoor air, respectively, and a guide duct having a duct frame for changing an air draw-in direction of the air being drawn into the blower fan and an air discharge direction of the air being discharged from the blower fan, and a sound absorbing member of a sound absorbing material provided to an inside surface of the duct frame.

In this case, the blower fan may include an air draw-in fan for drawing-in the outdoor air and an air discharge fan for discharging the room air, wherein the air discharge fan may be a cross flow fan which discharges the air flowing in a length direction of the housing to a direction perpendicular to the length direction of the housing to guide the air to a side direction of the housing.

And, the duct frame may have a rounded round portion.

And, the blower fan may include a fan housing having a blade assembly rotatably mounted therein, a shroud provided to both sides of the fan housing for guiding the air to the blade assembly, and a motor mount coupled to the shroud spaced a distance therefrom to have a motor assembly mounted thereto for supplying rotating power to the blade assembly.

In this instance, the motor mount may include a motor plate for supporting the motor assembly, a plurality of spacing portions provided at an edge of the motor plate each with a height of step for spacing the motor plate from the shroud by a fixed distance, and coupling portions connected to the spacing portions and mounted to the shroud.

And, the motor plate may include an inward cut-off portion formed in the motor plate between each of the spacing portions for enlarging a flow area of the air being drawn into the shroud.

In this case, the blower fan may include a fan housing, a shroud provided to each side of the fan housing provided with an orifice for guiding the air to an inside of the fan housing, and a blade assembly rotatably coupled in the fan housing provided with a plurality of blades exposed to an inside of the orifice for making the air to flow.

And, the orifice may be provided rounded with a fixed curvature, and tips of the blades may be provided projected to an inside edge of the orifice.

And, the plurality of blades may have a distance between adjacent blades configured the same with a length of the blade.

In this instance, the blower fan may include a fan housing having a blade assembly rotatably provided therein, and one pair of orifices formed to have curvatures different from each other on both sides of the fan housing for guiding the air being introduced to the fan housing.

And, if flow rates of the air being drawn into both sides of the fan housing are different from each other, the orifice on one side of the fan housing having the flow rate of the air relatively lower than the other side may have an inside diameter formed larger than the orifice on the other side of the fan housing.

In this case, of the one pair of the orifices, the curvature of the orifice on one side, which has a relatively larger inside diameter, may be smaller than the curvature of the orifice on the other side.

And, the one side of the fan housing having the relatively lower flow rate of the air may have the motor assembly mounted thereto for providing rotating power to the blade assembly.

In another aspect of the present invention, a ventilating apparatus includes a housing which forms an exterior, an air draw-in fan having a cross flow fan with a direction of a rotating shaft parallel to a length direction of the housing for drawing-in outdoor air, an air discharge fan having a cross flow fan with a direction of a rotating shaft perpendicular to a length direction of the housing for discharging room air, a heat exchanger for making the outdoor air being drawn by the air draw-in fan to heat exchange with the outdoor air being discharged by the air discharge fan, and a duct frame having a round portion formed at a corner for moderate change of an air draw-in direction being drawn into the air discharge fan and an air discharge direction being discharged from the air discharge fan.

And, since the housing has the room air outlet in a length direction one side end thereof, and the air discharge fan is provided in the vicinity of the room air outlet in an inside space of the housing, by connecting the air discharge fan to the room air outlet with the duct frame, a direction of the room air being discharged may be changed to a length direction of the housing.

And, the air draw-in fan and the air discharge fan may be provided with the heat exchanger disposed therebetween.

And, the duct frame may have a plurality of sound absorbing members of a sound absorbing material provided to an inside surface thereof.

And, the ventilating apparatus may further include a direct expansion coil for cooling or heating the room air heat exchanged at the heat exchanger.

In this instance, the ventilating apparatus may further include a humidifying unit for humidifying the room air heat exchanged at the heat exchanger.

And, the ventilating apparatus may further include a fan housing having a blade assembly rotatably provided in at least one of the air discharge fan and the air drawing-in fan, and one pair of orifices formed on both sides of the fan housing to have curvatures different from each other for guiding the air being drawn into the fan housing, wherein an inside diameter of the orifice in a direction the motor assembly is mounted thereto is larger than the inside diameter of the orifice mounted to the other side, and a curvature of the orifice in the direction the motor assembly is mounted thereto is smaller than the curvature of the orifice mounted to the other side.

Advantageous Effects

The ventilating apparatus of the present invention can reduce flow resistance of the air introduced to the blower fan of the ventilating apparatus, thereby minimizing generation of noise.

And, the ventilating apparatus of the present invention can reduce noise from the air being discharged.

And, the ventilating apparatus of the present invention can make a size of the ventilating apparatus compact.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE

Figure 1:
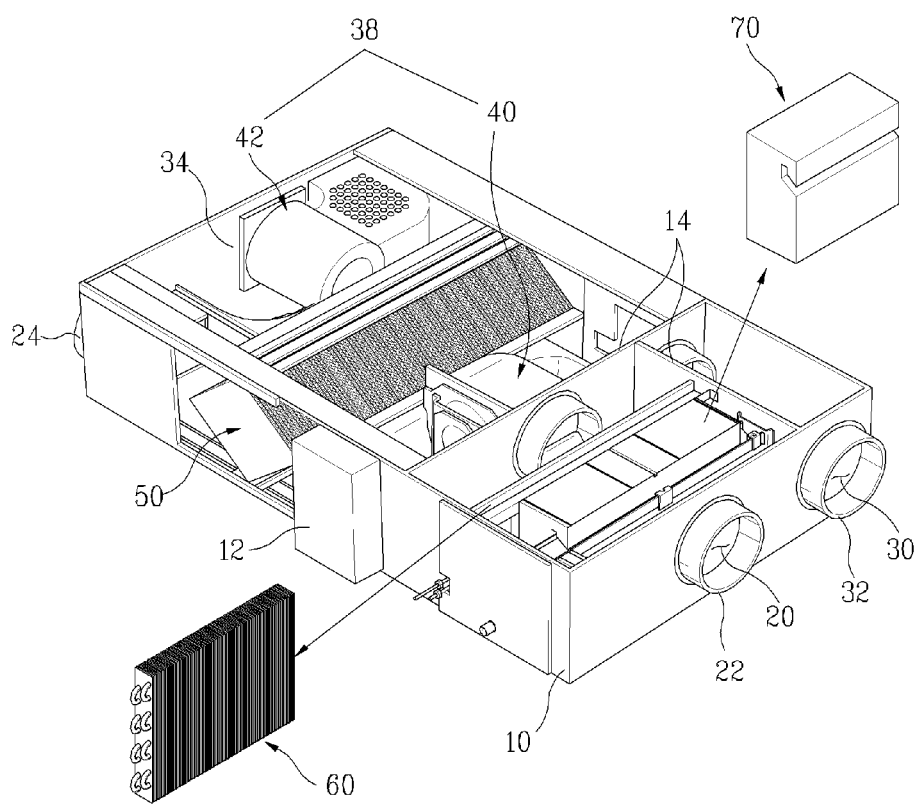
FIG. 1 illustrates a perspective view of a configuration of a ventilating apparatus in accordance with a preferred embodiment of the present invention.

Reference will now be made in detail to the specific embodiments of the present invention, examples of which are illustrated in the accompanying drawings FIG. 1 illustrates a perspective view of a configuration of a ventilating apparatus in accordance with a preferred embodiment of the present invention.

As shown in the drawing, the ventilating apparatus in accordance with a preferred embodiment of the present invention may include a blower fan 38 for making air to flow in a housing 10, and a heat exchanger unit 50 for heat exchange between outdoor air and room air, basically. In addition to this, the ventilating apparatus may include at least one of a cooling/heating unit 60 for cooling or heating the air introduced to the room, and a humidifying unit 70 for supplying moisture to the air.

The ventilating apparatus of the present invention may provide a ventilating function of ventilating the room air, a cooling/heating function for cooling or heating the outdoor air being introduced to the room, and a humidifying function for providing moisture to the outdoor air being introduced to the room.

The housing 10 may have a control box 12 provided thereto with a control unit provided thereto for general control of an air conditioner. The control unit may be provided for general control of the air conditioner.

The housing 10 has an empty hexahedral shaped inside provided with the blower fan 38, the heat exchanger unit 50, the humidifying unit 70, and so on. The housing 10 is provided with an air supply flow passage 20 and an air discharge flow passage 30 by a partition panel 14.

The air supply flow passage 20 forms a passage for introduction of the outdoor air into the room, and the air discharge flow passage 30 forms a passage for discharging the room air to outdoors. The air supply flow passage 20 and the air discharge flow passage 30 may be provided to cross each other at a portion thereof.

The housing 10 may have one side provided with an outdoor air outlet 22 which forms a portion of the air supply flow passage 20, and a room air inlet 32 which forms a portion of the air discharge flow passage 30.

The outdoor air outlet 22 serves as an outlet of the outdoor air being introduced to the room from the air supply flow passage 20, and the room air inlet 32 serves as an inlet of the room air being discharged to outdoors from the air discharge flow passage 30. The outdoor air outlet 22 and the room air inlet 32 may be provided adjacent to a room side.

The housing 10 may have the other side provided with an outdoor air inlet 24 which forms a portion of the air supply flow passage 20, and a room air outlet 34 which forms a portion of the air discharge flow passage 30.

The outdoor air inlet 24 serves as an inlet of the outdoor air into the room from the air supply flow passage 20, and the room air outlet 34 serves as an outlet of the room air being discharged to outdoors. The outdoor air outlet 22 and the room air inlet 32 may be provided adjacent to an outdoor side.

The blower fan 38 may be provided to the air supply flow passage 20 and the air discharge flow passage 30 for ventilating the room for making air to flow, and may include an air supply fan 40 and an air discharge fan 42.

The air supply fan 40 is provided to the air supply flow passage 20 for guiding the outdoor air to the room, and the air discharge fan 42 is provided to the air discharge flow passage 30 for guiding the room air to outdoors for ventilating the room air.

That is, the air supply fan 40 serves to draw-in the outdoor air forcibly and to supply the same to the room, and the air discharge fan 42 serves to draw-in the polluted air from the room forcibly and to discharge the same to outdoors.

Such a function of introducing outdoor fresh air into the room and discharging uncomfortable room air to outdoors is called as a ventilating function.

At a region the air supply flow passage 20 and the air discharge flow passage 30 cross each other, the heat exchanger unit 50 may be provided. In general, the heat exchanger unit 50 may be constructed in a rectangular column with a rectangular cross section. The heat exchanger unit 50 serves to perform to exchange humidity and thermal energy of the room air being discharged to outdoors with humidity and thermal energy of the outdoor air being introduced to the room, and, though not shown apparently, has a structure in which bent sheets and flat sheets (Partition sheets) arranged alternatively to enable heat exchange as the room air and the outdoor air proceeds along flow passages partitioned in a vertical direction.

That is, the heat exchanger unit 50 is operative according to a principle in which the air having a difference of temperatures and humidity are made to flow through different passages to cause conductive heat exchange in which latent heat is exchanged by moisture and sensible heat is exchanged by heat through a high efficiency thermal exchange film which forms passage layers different from each other.

This will be described in more detail. A flow passage of the air may be formed through opposite sides of four sides of the hexahedral heat exchanger unit 50. The air flow passage has a plurality of air supply passages (Not shown) in communication with the air supply flow passage 20 and a plurality of air discharge passages (Not shown) in communication with the air discharge flow passage 30, wherein the air supply passages and the air discharge passages are adjacent to each other in a vertical direction.

Therefore, the room air and the outdoor air passing through the heat exchanger unit 50 heat exchange as the room air and the outdoor air passes the air discharge passages and the air supply passages respectively, enabling the outdoor air to be introduced to the room with a temperature close to the room temperature. The heat exchanger unit 50 may have partition sheets provided between the air discharge passages through which the room air passes and the air supply passages through which the outdoor air passes for separating the passages.

The partition sheet serves to exchange the moisture and the thermal energy of the outdoor air and the room air with each other, while serving to block exchange of things like carbon dioxide and dust. According to this, the fresh outdoor air may be introduced to the room while absorbing the moisture and the thermal energy, and the dust and the like contained in the room air may be discharged to outdoors as it is.

The heat exchanger unit 50 may have a filter (Not shown) provided thereto. The filter makes a filtering action for filtering foreign matter from the air, and preferably, is detachably mounted to both sides of the heat exchanger unit 50.

That is, while the heat exchanger unit 50 serves to filter the foreign matter from the outdoor air for increasing purity of the air being supplied to the room, the heat exchanger unit 50 protects the heat exchanger unit 50 itself from the foreign matter to extend a lifetime thereof.

The heat exchanger unit 50 may have a purifying filter (Not shown) provided thereto for filtering dust particles from the outdoor air being drawn further and deodoring the air.

And, the cooling/heating unit 60 may be provided to the housing 10. The cooling/heating unit 60 serves to cool or heat the air introduced to the room passing through the heat exchanger unit 50.

The cooling/heating unit 60 may be connected to a cooling and heating unit (An air conditioner or the like) which absorbs heat or dissipates the heat to surroundings by using a phase change of refrigerant. For an example, the cooling/heating unit 60 may include a direct expansion coil or the like as a heat exchanger used as an evaporator or a condenser of the air conditioner or the like, and the cooling/heating unit 60 may be connected to an outdoor unit of the air conditioner or the like for having the refrigerant provided thereto.

Depending on design conditions, the cooling/heating unit 60 may be configured to provide only a cooling or heating function. If the cooling/heating unit 60 performs the function of heating the outdoor air only, the cooling/heating unit 60 may be configured to be an electric heater operative with electric resistance.

The humidifying unit 70 may be connected to have water supplied thereto from a utility water pipe (Not shown). The humidifying unit 70 serves to supply moisture to the air being introduced to the room through the cooling/heating unit 60.

The humidifying unit 70 may have a humidifying device (Not shown) positioned on the air supply flow passage 20 for supplying moisture to the outdoor air. The humidifying device may be formed of a material which draws-in the moisture by using a capillary tube phenomenon.

The guide duct 100 which forms the air discharge flow passage of the air discharge fan 42 will be described.

Figure 2:
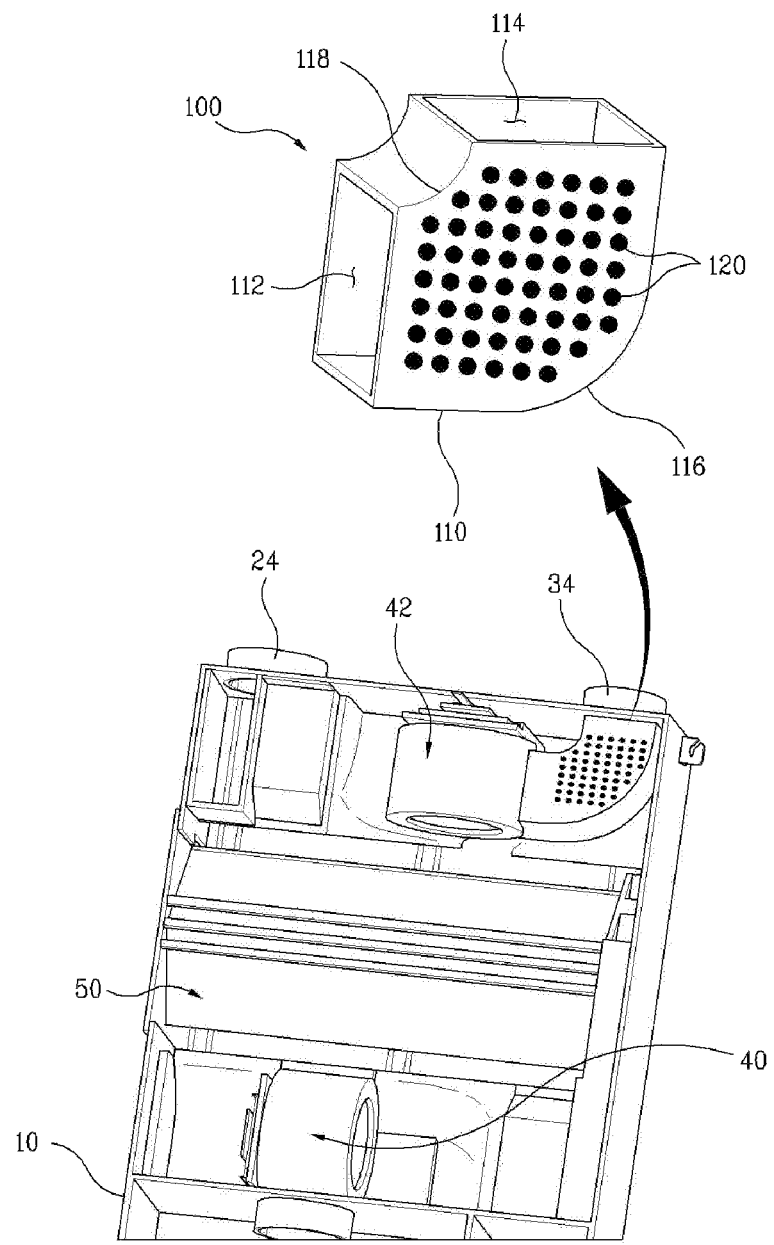
FIG. 2 illustrates a partial perspective view of a configuration around a guide duct in an embodiment of the present invention.

FIG. 2 illustrates a partial perspective view of a configuration around a guide duct in an embodiment of the present invention.

The blower fan 38 includes an air draw-in fan 40 for drawing-in the outdoor air and the air discharge fan 42 for discharging the room air, wherein the air discharge fan 42 may be a cross flow fan which discharges the air flowing in a length direction of the housing 10 to a direction perpendicular to the length direction of the housing 10 to guide the air to a side direction of the housing.

As shown in the drawing, the air discharge fan 42 may be provided to one end of the housing 10. The air discharge fan 42 may be provided to discharge the air flowing in the length direction of the housing 10 to the direction vertical to the length direction of the housing 10 to guide the air in the side direction of the housing 10.

The ventilating apparatus of the present invention may include the housing 10 which forms the air supply flow passage for introducing the outdoor air to the room and the air discharge flow passage for discharging the room air to outdoors, the blower fan 38 provided to each of the air supply flow passage and the air discharge flow passage for discharging the room air and drawing-in the outdoor air respectively, and the guide duct 100 having a duct frame for changing an air draw-in direction of the air being drawn into the blower fan 38 and an air discharge direction of the air being discharged from the blower fan, and a sound absorbing member 120 of a sound absorbing material provided to an inside surface of the duct frame.

The blower fan 38 may include the air draw-in fan 40 of a centrifugal fan having a direction of a rotation shaft parallel to a length direction of the housing for drawing-in the outdoor air, and the air discharge fan 42 of a centrifugal fan having a direction of a rotation shaft vertical to the length direction of the housing for discharging the room air. The air draw-in fan 40 and the air discharge fan 42 may be provided with the heat exchanger unit 50 disposed therebetween.

The air discharge direction of the air discharge fan 42 of the blower fan 38 is made to face the side of the housing 10, for directing the room air heat exchanged at the heat exchanger unit 50 to a side direction of the air discharge fan 42 including the cross flow fan, thereby improving air discharge efficiency. Since the cross flow fan has the air draw-in direction vertical to the air discharge direction, the guide duct 100 may be provided for guiding the room air to be discharged to the room air outlet 34.

The guide duct 100 may include a duct frame 110 having a round portion for changing an air discharge direction being discharged from the air discharge fan 42, moderately.

Since the housing 10 has the room air outlet 34 in a length direction one side end thereof, the air discharge fan 42 is provided in the vicinity of the room air outlet 34 in an inside space of the housing 10, and, since the duct frame 110 has an inlet 112 and an outlet 114 provided in a vertical direction to each other, by connecting the air discharge fan 42 to the room air outlet with the duct frame 110, a direction of the room air being discharged may be changed to a length direction of the housing.

The guide duct 100 may be provided to the air discharge direction of the air discharge fan 42. The guide dust 100 is connected to the air discharge fan 42 to reduce noise from air being discharged.

The guide duct 100 may have the duct frame 110 having the inlet 112 connected to the air discharge fan 42, the outlet 114 which discharges the air, both the inlet 112 and the outlet 114 provided in a vertical direction to each other, a plurality of holes (Not shown) formed therein, and the sound absorbing member 120 of the sound absorbing material provided to the duct frame 110 for reducing noise. The sound absorbing member 120 serves to absorb a portion of sound energy hitting a surface thereof to reduce reflection noise.

The inlet 112 and the outlet 114 are provided in a vertical direction to each other to discharge the air, flowing bent by the air discharge fan 42, to the one end of the housing 10. And, the air passing through the guide duct 100 has noise thereof reduced by the holes and the sound absorbing member 120.

The duct frame 110 may have round portions 116 and 118 respectively formed rounded at the inlet 112 and the outlet 114 for guiding an air flow direction. The round portions 116 and 118 are provided between the inlet 112 and the outlet 114 to serve to make smooth guide of a rapid change of the air flow. That is, the round portions 116 and 118 can change the air flow direction, moderately.

Figure 3:
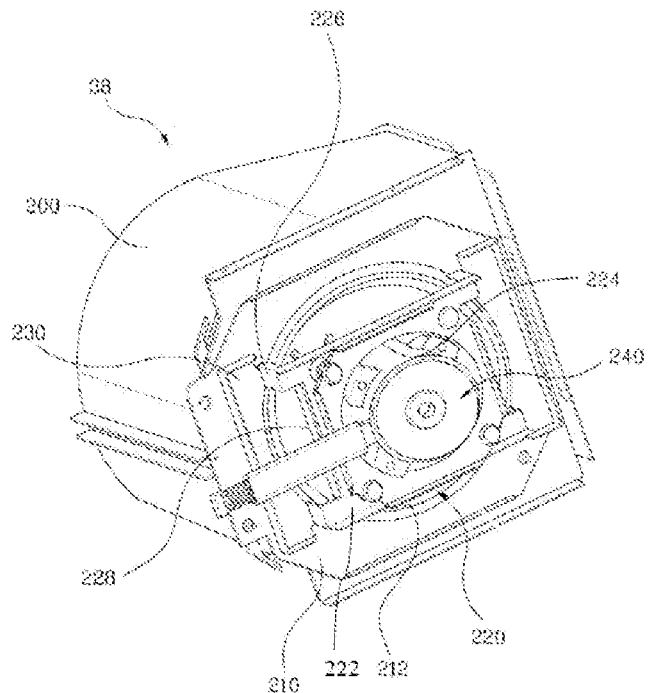
FIG. 3 illustrates a perspective view of a configuration of a blower fan in an embodiment of the present invention.

FIG. 3 illustrates a perspective view of a configuration of a blower fan in an embodiment of the present invention.

Referring to above drawing, the blower fan 38 may be the cross flow fan, for forced discharge of the room air to out-doors, or forced draw-in of the outdoor air into the room. The blower fan 38 may include the fan housing 200, a shroud 210, a motor mount 220, and a motor assembly 240.

Figure 4:
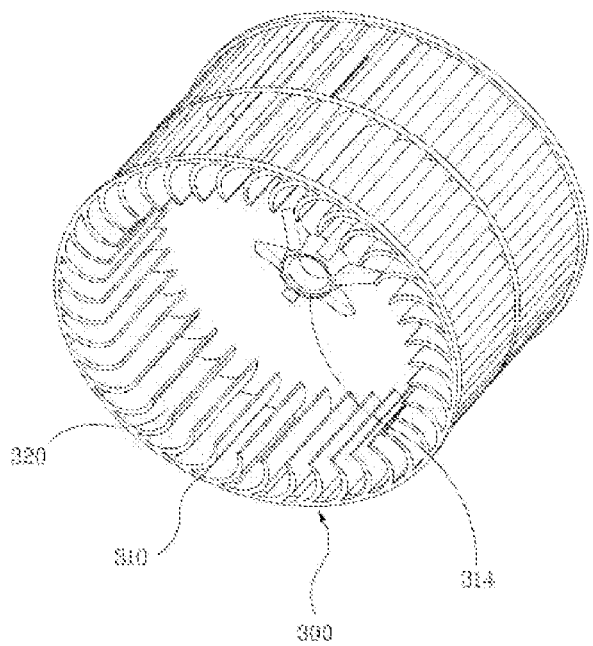
FIG. 4 illustrates a perspective view of a blade assembly of a blower fan in an embodiment of the present invention.

There may be a blade assembly 300 rotatably provided in the fan housing 200 (See FIG. 4). The fan housing 200 forms an exterior of the blower fan 38 to serve to protect the blade assembly 300. The blade assembly 300 is rotatably coupled to one side end of the motor assembly 240.

The shroud 210 is provided to one side of the fan housing 200 for guiding the air to the blade assembly 300. The shroud 210 may have an opening 213 formed on an inner side thereof for drawing-in the air. The opening 212 may be formed circular, substantially.

And, the motor mount 220 may be coupled to the shroud 210 spaced a distance therefrom. The motor mount 220 may be formed as one unit with the shroud 210 or fixed thereto with welding or the like. The motor mount 220 may have the motor assembly 240 mounted thereto for providing a rotating power to the blade assembly 300.

The motor mount 220 may include a motor plate 222 for supporting the motor assembly 240, a plurality of spacing portions 226 provided at an edge of the motor plate 222 each with a height of step for spacing the motor plate 222 from the shroud 210 by a fixed distance, and coupling portions 230 connected to the spacing portions 226 and mounted to the shroud 210.

Since the spacing portions 226 are provided to the edge of the motor plate 222 such that the motor plate 222 is at a height from the shroud 210, there may be a fixed height of an air flow space formed between the motor plate 222 and the shroud 210. There may be a motor mounting portion 224 at the center of the motor plate 222 for mounting the motor assembly 240 thereto.

And, between the plurality of spacing portions 226 of the motor plate 222, there may be inward cut-off portions 228 formed in the motor plate 222 for enlarging a flow area of the air being drawn into the shroud 210.

The cut-off portion 228 may be formed in portions of the motor plate 222 excluding a region the motor assembly 240 is mounted thereto. The spacing portion 226 serves to enlarge a flow area of the air being drawn into a side of the motor plate 222, and the cut-off portion 228 serves to enlarge a flow area of the air being drawn into a front of the motor plate 222.

Thus, by increasing the draw-in area of the air, the motor mount 220 can reduce a flow resistance, a load on the blade assembly 300, and noise.

FIG. 4 illustrates a perspective view of a blade assembly of a blower fan in an embodiment of the present invention.

As shown in above drawing, the blade assembly 300 may include a circular blade frame 310, and blades 320 formed at fixed intervals on an inside of the blade frame 310 for forming an air flow by rotation. Provided on an inside of the blades 320, there may be a shaft coupling 314 for the blade assembly 300 to be coupled to the motor assembly 240.

Figure 5:
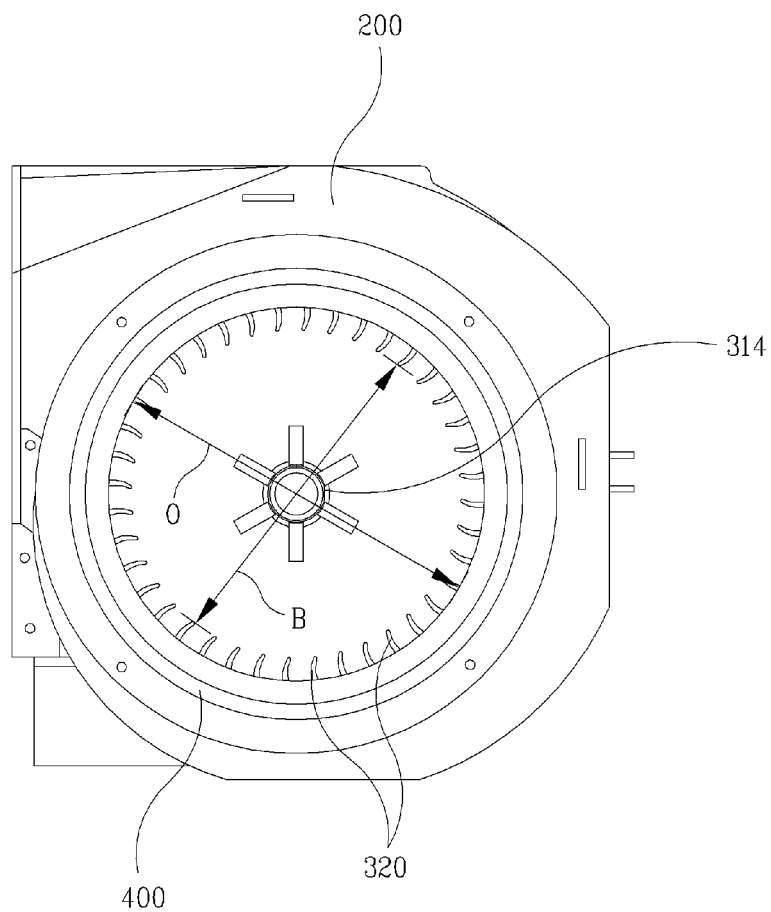
FIG. 5 illustrates a front view showing a relation of a blade and an orifice in an embodiment of the present invention.

FIG. 5 illustrates a front view showing a relation between blades and an orifice in an embodiment of the present invention.

As shown in above drawing, the fan housing 200 may have shrouds 210 provided to both sides thereof respectively provided with orifices 400 for guiding the air to the inside of the fan housing 200. The orifice 400 may have a predetermined curvature with a round for guiding the air flowing along the shroud 210 to the inside of the fan housing 200.

And, the blades 320 may be provided to be exposed to an inside of the orifice 400. For this, an inside diameter B formed by continuous tips of the plurality of blades 320 may be smaller than an inside diameter O of the orifice 400.

This will be described in more detail. As the tips of the blades 320 are provided to be projected to an inside edge of the orifice 400 to make the tips of the blades 320 to be in direct contact with the air introduced to the orifice 400. Thus, if the air introduced thus is come into direct contact with the tips of the blades 320, minimizing flow separation and resistance, flow noise can be minimized.

A distance between the plurality of blades 320 and a length of each of the blades 320 are made the same for making the air flow smooth. In order to make the tip of the blade 320 to be projected to the inside edge of the orifice 400, since it is required to form the length of the blade 320 relatively extensive, making the distance between the blades 320 to increase too, a number of the blades 320 may be relatively small.

Figure 6:
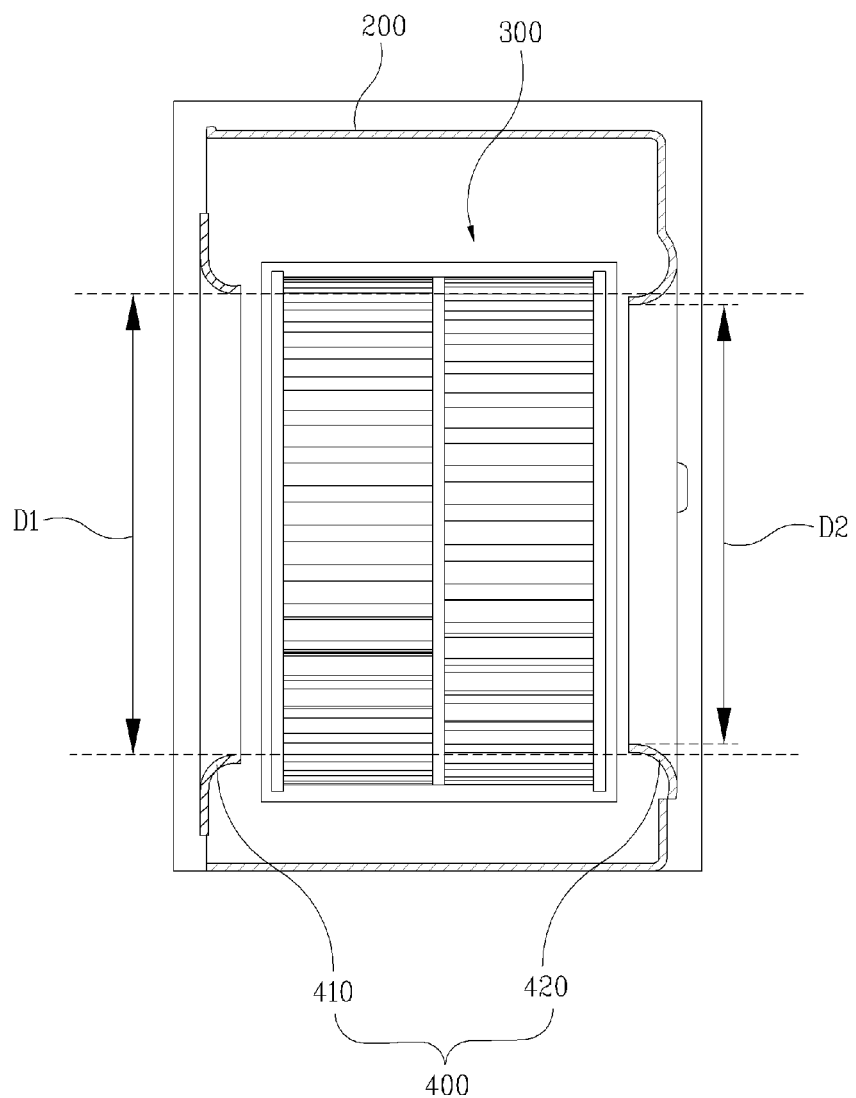
FIG. 6 illustrates a section showing a curvature and a diameter of an orifice on each side of a blower fan in an embodiment of the present invention.

FIG. 6 illustrates a section showing a curvature and a diameter of an orifice on each side of a blower fan in an embodiment of the present invention.

Sine the motor assembly 240 is provided to one side of the fan housing 200 keeping a flow rate of the air lower than the other side. If the air flow rates are different between both sides of the fan housing 200 thus, a performance and a lifetime of the blade assembly 300 may become poor.

Therefore, one pair of the orifices 400 are provided to both side of the fan housing 200 at curvatures different from each other for reducing a difference of the flow rates between both sides of the fan housing 200.

The embodiment suggests the orifices 400 to include a first orifice 410 having a relatively small curvature and a second orifice 420 having a relatively large curvature.

In this instance, the first orifice 410 mounted to a region the motor assembly is mounted thereto has an inside diameter D1 larger than the inside diameter D2 of the second orifice 420 for increasing a flow area relatively to increase the air flow rate, and the first orifice 410 has a curvature formed smaller than the second orifice 420 to reduce a difference of air flow rates introduced through the orifices. This causes an effect of air flow rate increase.

That is, of the one pair of the orifices 400, the curvature of the first orifice 410 which has a relatively larger inside diameter may be smaller than the curvature of the second orifice 420.

Accordingly, in a case the flow rates of the air introduced to both sides of the fan housing 200 are different from each other, the inside diameter of the first orifice 410 provided to the one side of the fan housing 200 having a relatively low flow rate is formed larger than the inside diameter of the second orifice 420 provided to the other side of the fan housing 200, for increasing an air flow area of the first orifice 410 which has a lower air flow rate, enabling to reduce the difference of air flow rates between both sides of the blower fan 38.

Of course, it is preferable that the motor assembly 240 which provides the rotation power to the blade assembly 300 is mounted to one side of the fan housing 200 having the relatively low air flow rate.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A ventilating apparatus comprising:
   a housing which forms an air supply flow passage for introducing outdoor air into a room, and an air discharge flow passage for discharging room air to outdoors;
   an air discharge fan provided to the air discharge flow passage for discharging the room air;
   an air draw-in fan provided to the air supply flow passage for drawing-in outdoor air; and
   a guide duct having a duct frame in the housing for changing an air discharge direction of the air being discharged from the air discharge fan, wherein at least one of the air discharge fan and the air drawing-in fan includes:
      a fan housing having a blade assembly rotatably mounted therein;
      a shroud on two sides of the fan housing for guiding the air to the blade assembly; and
      a motor mount coupled to the shroud and spaced a distance therefrom including a motor assembly mounted thereto for supplying power to the blade assembly,
   wherein the motor mount includes:
      a motor plate for supporting a rear end portion of the motor assembly;
      a plurality of spacing portions at an edge of the motor plate, the motor plate spaced a predetermined distance from the shroud by the plurality of spacing portions; and
      coupling portions connected to the spacing portions and mounted to the shroud,
   wherein the motor plate includes an inward cut-off portion between two of the spacing portions for increasing a free area of the air being drawn into the shroud.

2. The ventilating apparatus as claimed in claim 1, wherein the air discharge fan is a centrifugal fan which discharges the air flowing in a length direction of the housing to a direction perpendicular to the length direction of the housing to guide the air to a side direction of the housing.

3. The ventilating apparatus as claimed in claim 2, wherein the duct frame has an inner radius and an outer radius of a radius elbow.

4. The ventilating apparatus as claimed in claim 1, wherein at least one of the air discharge fan and the air drawing-in fan includes;
   a fan housing,
   a shroud provided to each side of the fan housing provided with an orifice for guiding the air to an inside of the fan housing, and
   a blade assembly rotatably coupled in the fan housing provided with a plurality of blades exposed to an inside of the orifice for making the air to flow.

5. The ventilating apparatus as claimed in claim 4, wherein the orifice is provided rounded with a fixed curvature, and tips of the blades are provided projected to an inside edge of the orifice.

6. The ventilating apparatus as claimed in claim 5, wherein the plurality of blades have a distance between adjacent blades configured the same with a length of the blade.

7. The ventilating apparatus as claimed in claim 1, wherein at least one of the air discharge fan and the air drawing-in fan includes;
   a fan housing having a blade assembly rotatably provided therein, and
   one pair of orifices formed to have curvatures different from each other on both sides of the fan housing for guiding the air being introduced to the fan housing.

8. The ventilating apparatus as claimed in claim 7, wherein, if flow rates of the air being drawn into both sides of the fan housing are different from each other, the orifice on one side of the fan housing having the flow rate of the air relatively lower than the other side has an inside diameter formed larger than the orifice on the other side of the fan housing.

9. The ventilating apparatus as claimed in claim 8, wherein, of the one pair of the orifices, the curvature of the orifice on one side, which has a relatively larger inside diameter, is smaller than the curvature of the orifice on the other side.

10. The ventilating apparatus as claimed in claim 8, wherein the one side of the fan housing having the relatively lower flow rate of the air has the motor assembly mounted thereto for providing rotating power to the blade assembly.

\* \* \* \* \*